(12) United States Patent
Wu

(10) Patent No.: US 9,841,139 B1
(45) Date of Patent: Dec. 12, 2017

(54) HOLDER

(71) Applicant: TCT Nanotec Co., Ltd., Taichung (TW)

(72) Inventor: Tiger Wu, Taichung (TW)

(73) Assignee: TCT Nanotec Co., Ltd., Taichung (TW)

( * ) Notice: Subject to any disclaimer, the term of this patent is extended or adjusted under 35 U.S.C. 154(b) by 0 days.

(21) Appl. No.: 15/486,409

(22) Filed: Apr. 13, 2017

(51) Int. Cl.
*F16M 13/02* (2006.01)
*F16M 11/10* (2006.01)
*F16M 11/20* (2006.01)

(52) U.S. Cl.
CPC .......... *F16M 13/02* (2013.01); *F16M 11/105* (2013.01); *F16M 11/2064* (2013.01); *F16M 2200/024* (2013.01)

(58) Field of Classification Search
CPC .. F16M 13/02; F16M 11/105; F16M 11/2064; F16M 2200/024
See application file for complete search history.

(56) References Cited

U.S. PATENT DOCUMENTS

| 5,751,548 | A * | 5/1998 | Hall | F16C 11/10 248/122.1 |
| 6,505,988 | B1 * | 1/2003 | Oddsen, Jr. | F16M 11/105 248/278.1 |
| 6,935,883 | B2 * | 8/2005 | Oddsen, Jr. | H01R 13/625 248/274.1 |
| 7,063,296 | B2 * | 6/2006 | Williams | F16M 11/10 248/244 |
| 7,604,210 | B2 * | 10/2009 | Oddsen, Jr. | F16M 11/105 248/280.11 |
| 7,673,838 | B2 * | 3/2010 | Oddsen, Jr. | F16M 11/041 248/221.11 |
| 8,523,131 | B2 * | 9/2013 | Derry | F16M 11/04 16/338 |
| 9,746,125 | B2 * | 8/2017 | Bowman | F16M 11/10 |

* cited by examiner

*Primary Examiner* — Anita M King
(74) *Attorney, Agent, or Firm* — Alan D. Kamrath; Kamrath IP Lawfirm, P.A.

(57) ABSTRACT

A holder includes a plate, a bracket, a connector, an angle-retaining element, a fastener and a carrier. The plate is connected to an external object. The bracket includes two lugs extending from a positioning portion. The positioning portion is rotationally connected to the plate. The first lug extends from the positioning portion and includes a smaller aperture in communication with a larger aperture. The second lug extends from the positioning portion and includes a countersink hole. The connector includes an axle extending along a vertical axis from the bearing. The bearing is located between the lugs and formed with a tapered bore along a horizontal axis. The angle-retaining element includes an enlarged head inserted in the larger aperture and a tapered portion inserted in the tapered bore. The fastener includes is inserted in the angle-retaining element, the lugs and the bearing. The carrier includes a bearing for receiving the axle.

17 Claims, 10 Drawing Sheets

HOLDER

BACKGROUND OF INVENTION

1. Field of Invention

The present invention relates to a holder and, more particularly, to a holder that can be rotated about a vertical axis, a horizontal axis and another axis extending perpendicular to the horizontal axis and kept in a desired position.

2. Related Prior Art

A surveillance camera, a flat-panel monitor, a display frame, a light or the like is often kept in position with a holder. It is sometimes desirable to change the angle of such device. For example, it is desirable to change the angle of a surveillance camera to take a clear image. It is desirable to change the angle of a flat-panel display to provide a clear view for a user. It is desirable to change the angle of a light to cast light on a desired spot. Therefore, the change of the angle of such device is often done by changing the angle of such holder. The angle of such holder must be changeable and can be kept if so desired. The holder must be able to remain in a desired position against the gravity.

The present invention is therefore intended to obviate or at least alleviate the problems encountered in prior art.

SUMMARY OF INVENTION

It is the primary objective of the present invention to provide a reliable holder.

To achieve the foregoing objective, the holder includes a plate, a bracket, a connector, an angle-retaining element, a fastener and a carrier. The plate is connected to an external object in use. The bracket includes two lugs extending from a positioning portion. The positioning portion is rotationally connected to the plate. The first lug extends from the positioning portion and includes a smaller aperture in communication with a larger aperture. The second lug extends from the positioning portion. The connector includes an axle extending along a vertical axis from the bearing. The bearing is located between the first and second lugs and formed with a tapered bore along a horizontal axis. The angle-retaining element includes an enlarged head inserted in the larger aperture and a tapered portion inserted in the tapered bore. The fastener is inserted in the angle-retaining element, the first and second lugs and the bearing. The carrier includes a bearing for receiving the axle.

Advantageously, the holder allows the external object to be rotated about a vertical axis, a horizontal axis and another axis extending perpendicular to the horizontal axis.

Moreover, the holder is able to prevent the external object from tilting about the horizontal axis against the weight of the external object.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
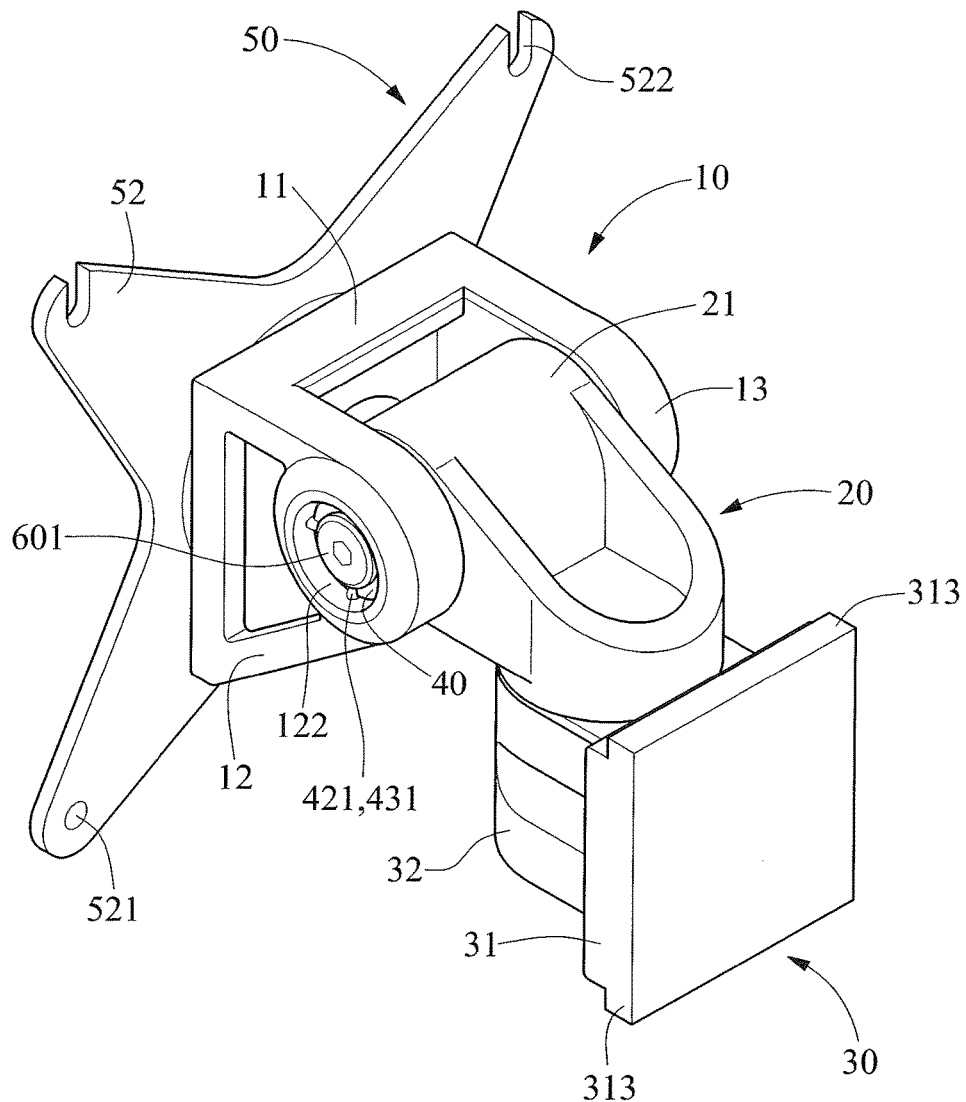
FIG. 1 is a perspective view of a holder according to the preferred embodiment of the present invention.
Figure 2:
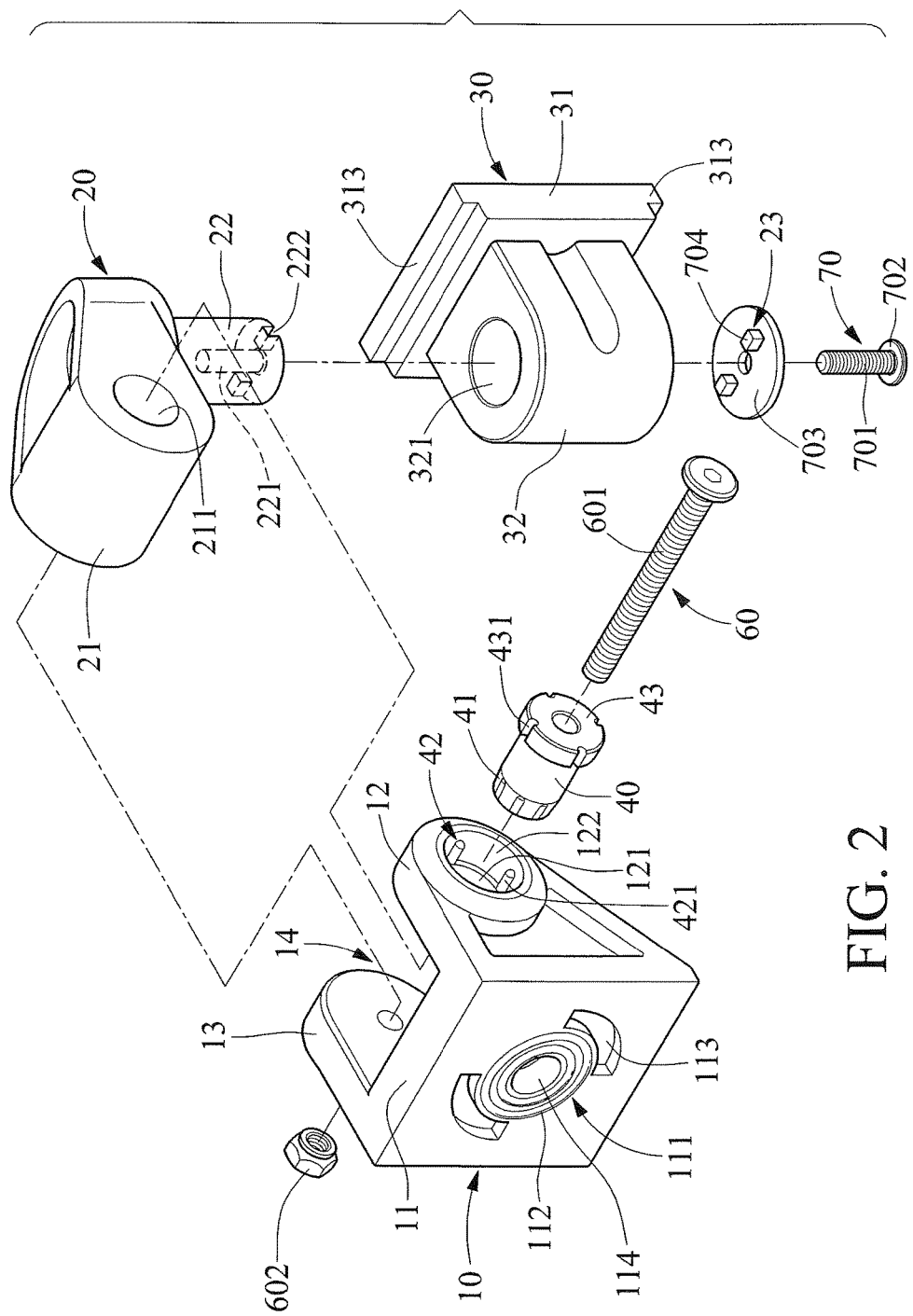
FIG. 2 is a partial and exploded view of the holder shown in FIG. 1.

Referring to FIGS. 1 through 5, a holder includes a bracket 10, a connector 20, a carrier 30, an angle-retaining element 40, a plate 50 and three fasteners 60, 70 and 80 according to the preferred embodiment of the present invention. The fastener 60 preferably includes a threaded bolt 601 and a nut 602 adapted for engagement with the threaded bolt 601. The threaded bolt 601 is formed with a threaded portion (not numbered) and an enlarged head (not numbered). The fastener 70 is preferably a threaded bolt formed with a threaded bolt 701 and an enlarged head 702. The fastener 80 is preferably a rivet that includes a first end and an enlarged second end.

The bracket 10 includes a positioning portion 11 and two lugs 12 and 13 extending from a rear face of the positioning portion 11, with a gap 14 between the lugs 12 and 13. The positioning portion 11 includes a contact portion 111 formed on a front face thereof and a central aperture 114 made therein. The contact portion 111 consists of several concentric annular ribs 112 extending around the central aperture 114. The lug 12 is made with a countersink hole that consists of a smaller aperture 121 and a larger aperture 122, with a shoulder formed between the apertures 121 and 122. The apertures 121 and 122 are coaxial and in communication with each other. The lug 13 includes a countersink hole 131. The countersink hole 131 includes a polygonal portion corresponding that of an ordinary nut.

The connector 20 is formed with a bearing 21 extending horizontally and an axle 22 extending vertically from the bearing 21. The bearing 21 includes a tapered bore 211. The tapered bore 211 includes a smaller end 212 and a larger end 213. The larger end 213 of the tapered bore 211 is located on a side of the bearing 21. The axle 22 is made with a screw hole 221 and two recesses 222. The screw hole 221 is located between the recesses 222.

A washer 23 includes an annular portion 703 and two bosses 704 formed on the annular portion 703. The bosses 704 are shaped and located corresponding to the recesses 222.

The carrier 30 includes a sled 31 and a bearing 32 formed on a front face of the sled 31. The sled 31 includes two flanges 313 respectively extending from upper and lower edges thereof. The bearing 32 is made with a tunnel 321 extending vertically.

The angle-retaining element 40 includes a tapered portion 41 formed at an end thereof and an enlarged head 43 formed at another end thereof. The tapered portion 41 of the angle-retaining element 40 is formed with an anti-skid face. The enlarged head 43 includes several cutouts 431 in the periphery thereof.

The plate 50 preferably includes a central aperture 501 and four prongs 52 extending in a radial manner. Each of two lower ones of the radial prongs 52 includes an aperture 521. Each of two upper ones of the radial prongs 52 includes a cutout 522.

In assembly, the axle 22 is inserted in the tunnel 321 of the bearing 32. The washer 23 is located at a free end of the axle 22. The threaded portion 701 of the fastener 70 is inserted in the screw hole 221 via the washer 23. The enlarged head 702 of the fastener 70 is pressed against the washer 23. Thus, the connector 20 is locked to the sled 30. The bosses 704 are inserted in the recesses 222 to prevent the washer 23 from rotation relative to the connector 20.

The fastener 80 is inserted in the apertures 114 and 501 so that the first end thereof is located on a front face of the plate 50 while the second end thereof is located on a rear face of the positioning portion 11. Then, the first end of the fastener 80 is punched and enlarged so that the plate 50 is rotationally connected to bracket 10. The annular rings 112 of the contact portion 111 are in contact with the plate 50 to reduce friction between the positioning portion 11 and the plate 50.

A limiting unit 51 is used to limit the rotation of the plate 50 relative to the bracket 10 in a range. The limiting unit 51 includes at least one block 511 formed on the plate 50 and at least one arched groove 113 made in the positioning portion 11. The arched groove 113 extends around the annular ribs 112. The block 511 is movably inserted in the arched groove 113.

The hub 21 is located between the lugs 12 and 13. The tapered portion 41 of the angle-retaining element 40 is inserted in the tapered bore 211 of the bearing 21. Another portion of the angle-retaining element 40 is inserted in the smaller aperture 121 of the lug 12. The enlarged head 43 of the angle-retaining element 40 is inserted in the larger aperture 122 of the lug 12.

A nut 602 is inserted in the countersink hole 131 of the lug 13. The nut 602 is not rotatable relative to the lug 13 because the nut 602 is made with a polygonal periphery compliant to the polygonal portion of the countersink hole 131. The threaded portion of the threaded bolt 601 is inserted in the lug 13, the bearing 21 and the angle-retaining element 40, which is inserted in the smaller aperture 121 of the lug 12. Then, the threaded portion of the threaded bolt 601 is engaged with the nut 602. The enlarged head of the threaded bolt 601 is placed against the angle-retaining element 40. Thus, the bracket 10 is connected to the connector 20.

A restraining unit 42 is used to prevent the angle-retaining element 40 from rotation relative to the lug 12. The restraining unit 42 includes several ribs 421 formed on the wall of the larger aperture 122. The ribs 421 of the restraining unit 42 are inserted in the cutouts 431 of the enlarged head 43 of the angle-retaining element 40.

Figure 5:
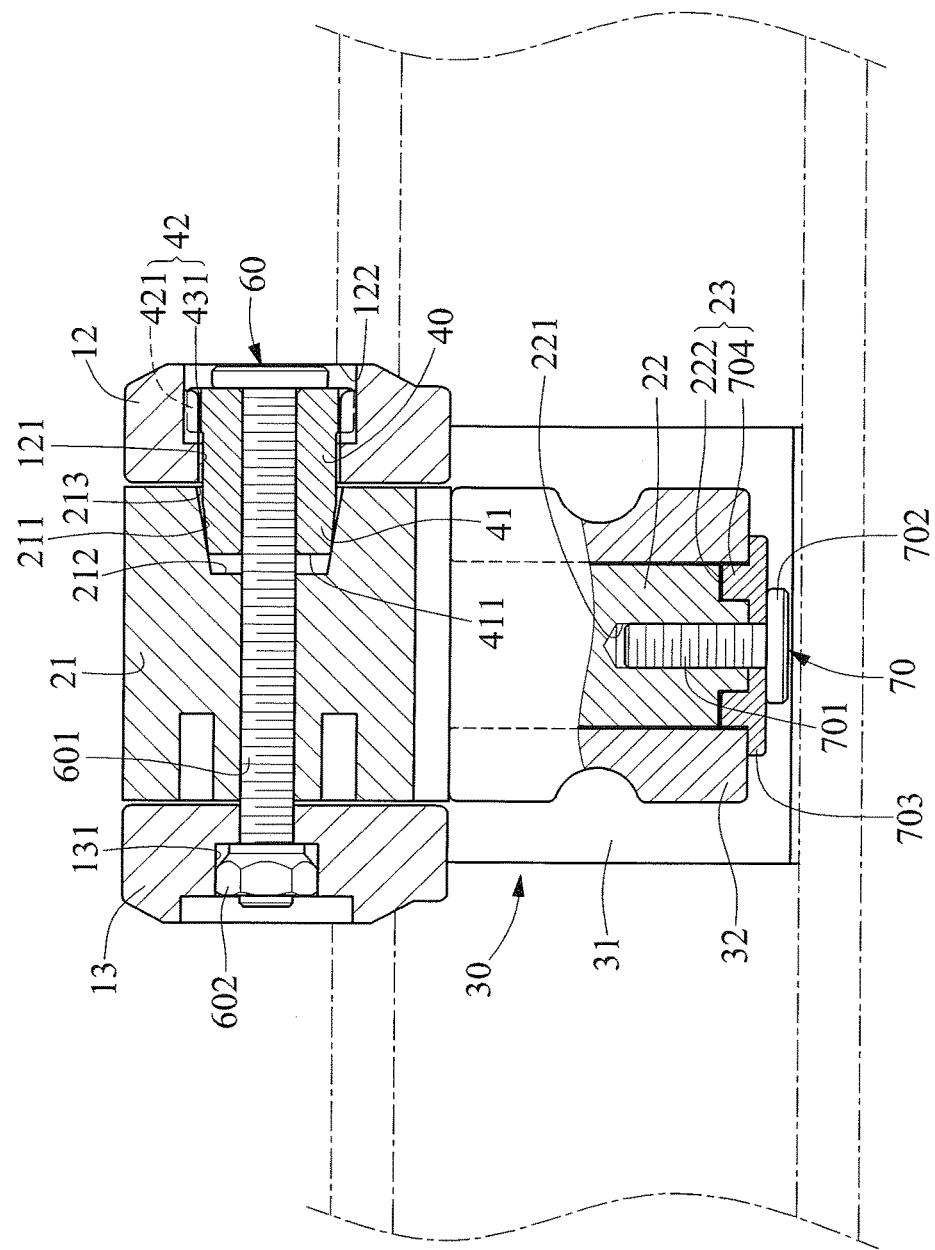
FIG. 5 is a cross-sectional view of the holder taken along a line V-V shown in FIG. 1.
Figure 6:
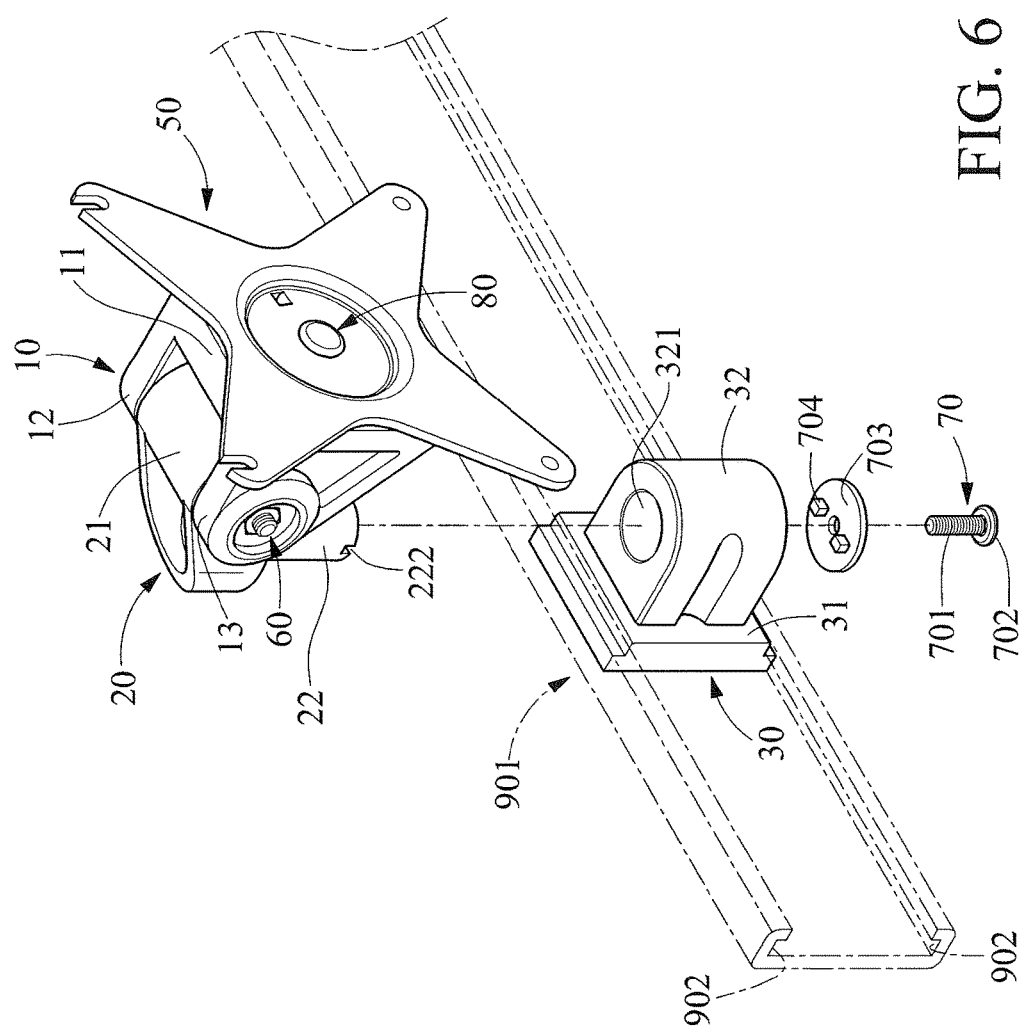
FIG. 6 is an exploded view of the holder shown in FIG. 1 supported on a track.

Referring to FIG. 5, the slope of the tapered portion 41 relative to an axis of the angle-retaining element 40 may or may not be identical to that of the tapered bore 211. In the preferred embodiment, the slope of the tapered portion 41 is not identical to that of the tapered bore 211. A free end 411 of the tapered portion 41 is made with a diameter larger than that of the smaller end 212 of the tapered bore 211.

Referring to FIGS. 4 through 7, the carrier 30 is supported on a track 901. The flanges 312 of the sled 31 are inserted in two grooves 902 of the track 901. Thus, the carrier 30 is horizontally movable along the track 901.

Figure 4:
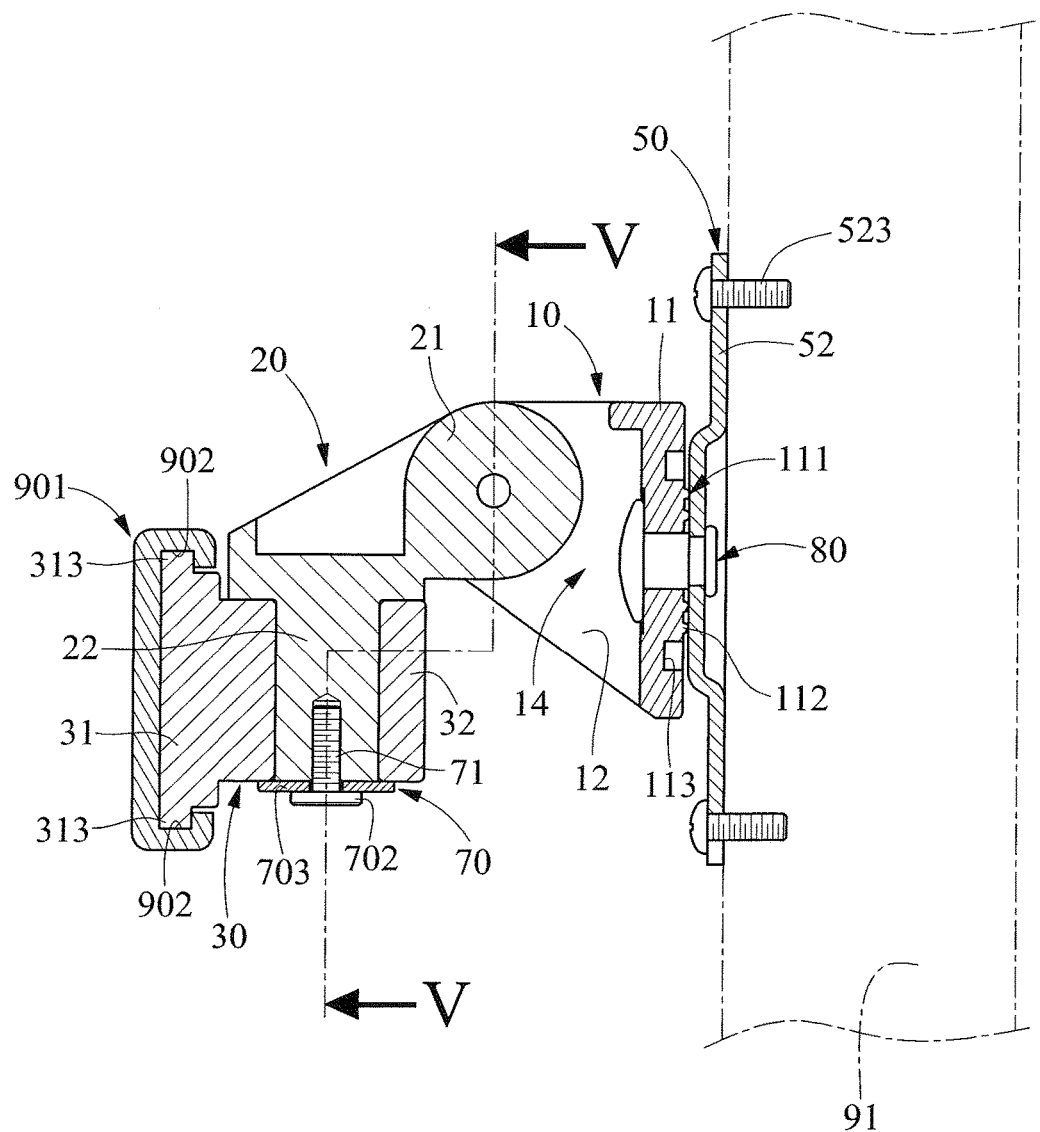
FIG. 4 is a cross-sectional view of the holder shown in FIG. 1.
Figure 7:
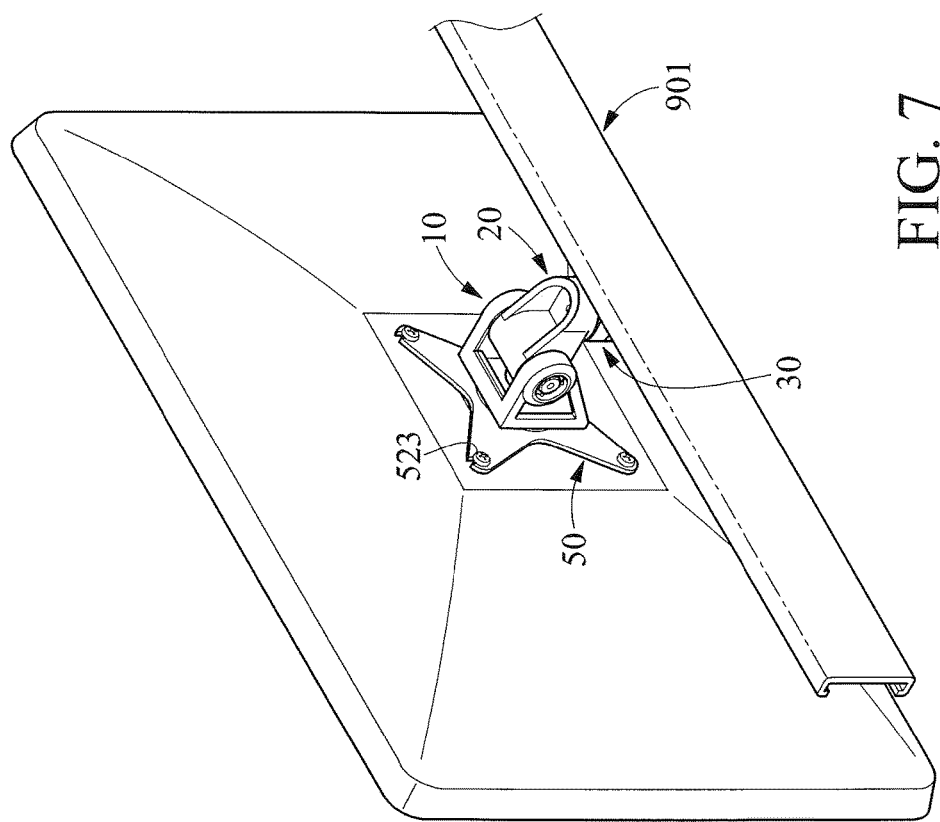
FIG. 7 is a rear perspective view of a flat-panel display held on the holder shown in FIG. 6.

Referring to FIGS. 4 and 7, several screws 523 are inserted in a flat-panel display 91 via the apertures 521 and the cutouts 522 of prongs 52 of the plate 50. Thus, the flat-panel display 91 is connected to the plate 50. Similarly, another proper external object such as a surveillance camera, a display frame, and a light can be connected to the plate 50.

Figure 8:
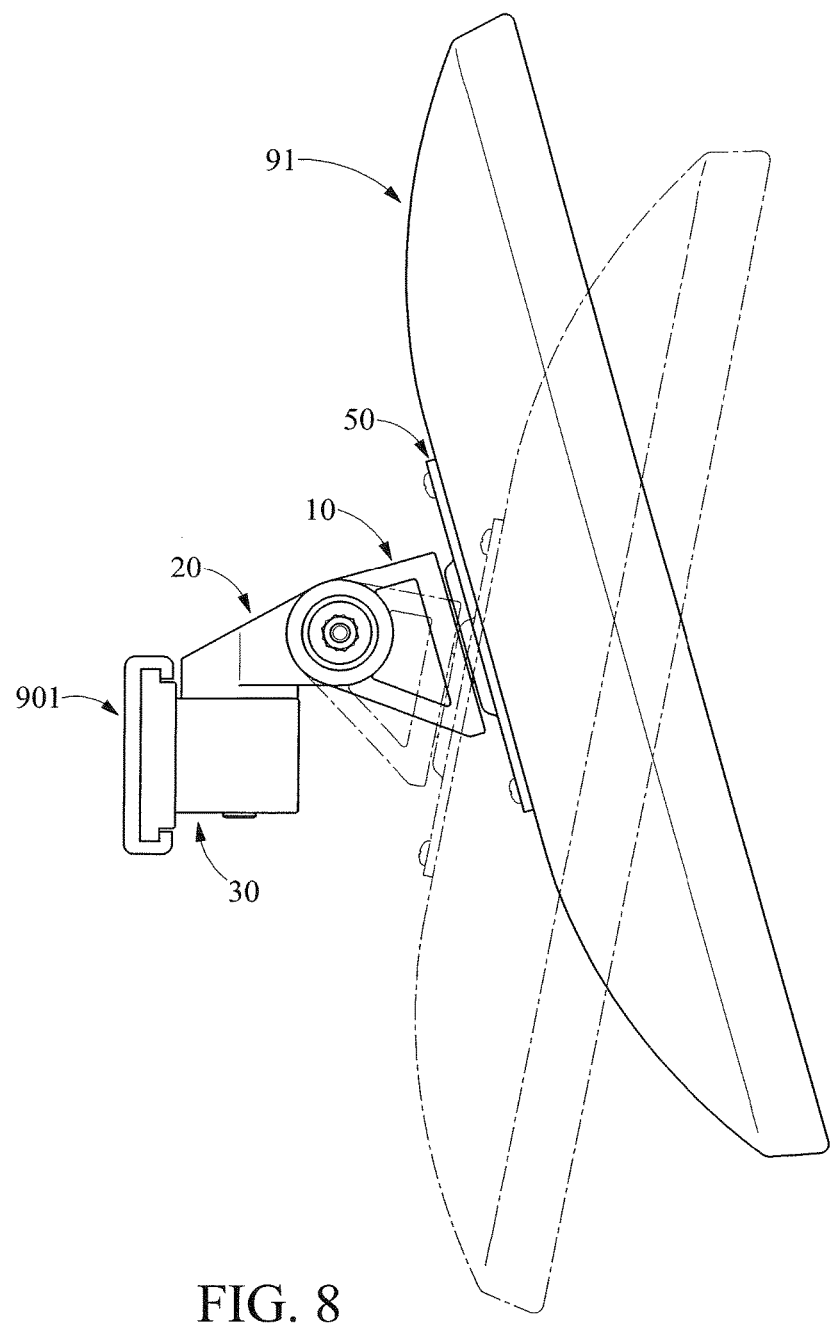
FIG. 8 is a side view of the flat-panel display held rotatable about a horizontal axis by the holder shown in FIG. 7.

Referring to FIGS. 5 and 8, the bearing 21 of the connector 20 is not clamped by the lugs 12 and 13, and the tapered portion 41 is slack in the tapered bore 211 when the threaded bolt 601 is not tightly engaged with the nut 602. Hence, the bracket 10 can be pivoted to a desired angle about a horizontal axis relative to the bearing 21 of the connector 20.

The threaded bolt 601 is tightly engaged with the nut 602 as the flat-panel display 91 is in the desired angle relative to the bearing 21 of the connector 20. Thus, the bearing 21 is clamped by the lugs 12 and 13, and the periphery of the tapered portion 41 of the angle-retaining element 40 is tightly pressed against the wall of the tapered bore 211, i.e., the flat-panel display 91 is kept in the desired angle relative to the bearing 21 of the connector 20. As the engagement of the threaded bolt 601 with the nut 602 gets tighter, the clamping of the bearing 21 by the lugs 12 and 13 gets tighter, and so does the contact of the periphery of the tapered portion 41 of the angle-retaining element 40 with the wall of the tapered bore 211 of the bearing 21. That is, the positioning of the bracket 10 relative to the connector 20 is firmer, and so is the positioning of the flat-panel display 91 in the desired angle relative to the connector 20.

Figure 9:
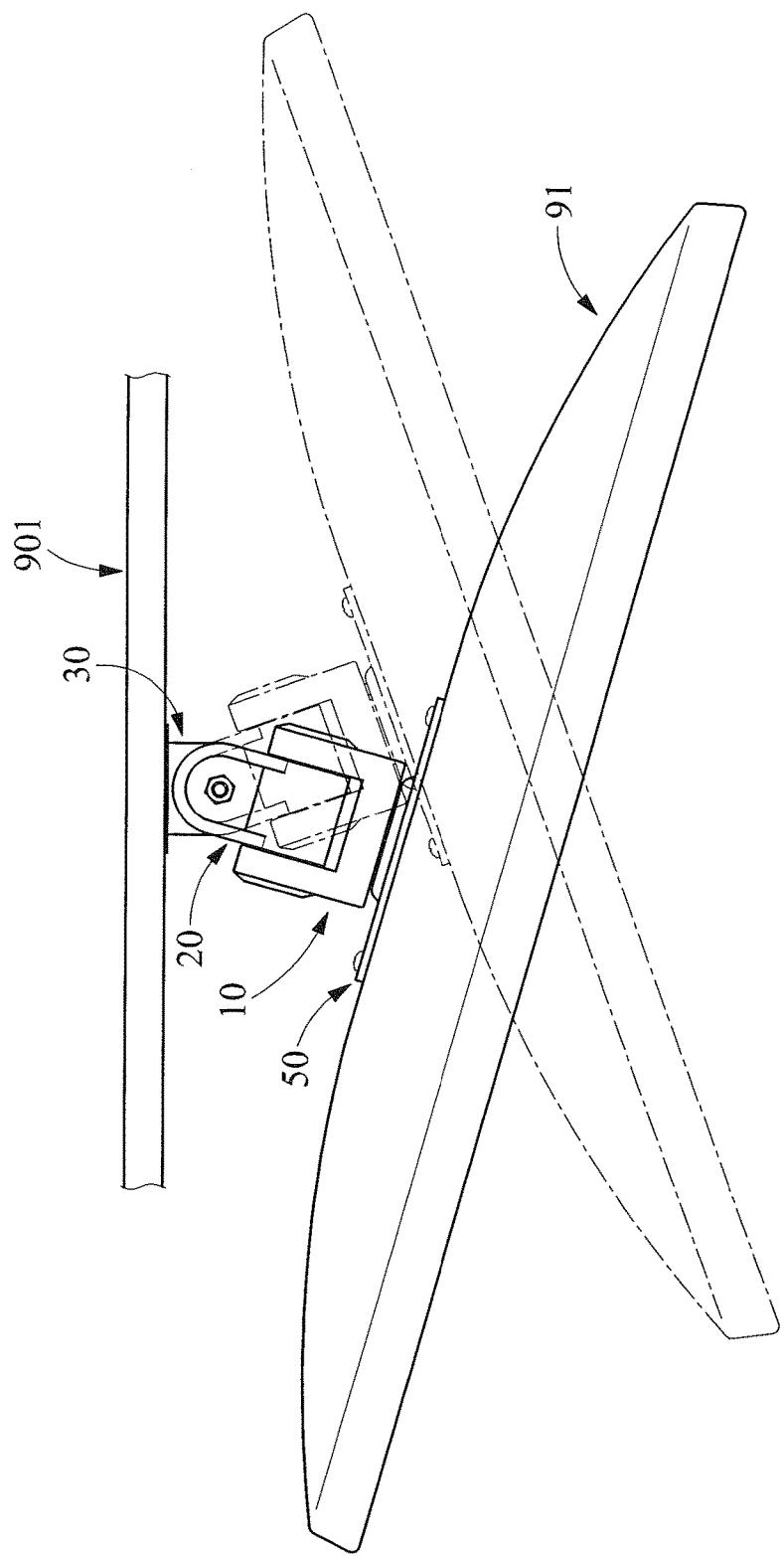
FIG. 9 is a top view of the flat-panel display held rotatable about a vertical axis by the holder shown in FIG. 7.

Referring to FIGS. 4, 5 and 9, the axle 22 is slack in the bearing 32 when the threaded bolt 701 of the threaded bolt 70 is not tightly inserted in the screw hole 221. Thus, the axle 22 can be pivoted about a vertical axis relative to the bearing 32. Hence, the bracket 10, the plate 50 and the flat-panel display 91 can be pivoted to a desired angle about the vertical axis relative to the carrier 30. The washer 23 can be pivoted with the axle 22 because the bosses 704 are inserted in the recesses 222.

The threaded bolt 701 of the threaded bolt 70 is tightly inserted in the screw hole 221 when the flat-panel display 91 is in the desired angle relative to the carrier 30. Thus, the bearing 32 is clamped by the connector 20 and the washer 23, i.e., the flat-panel display 91 is kept at the desired angle relative to the carrier 30.

Figure 3:
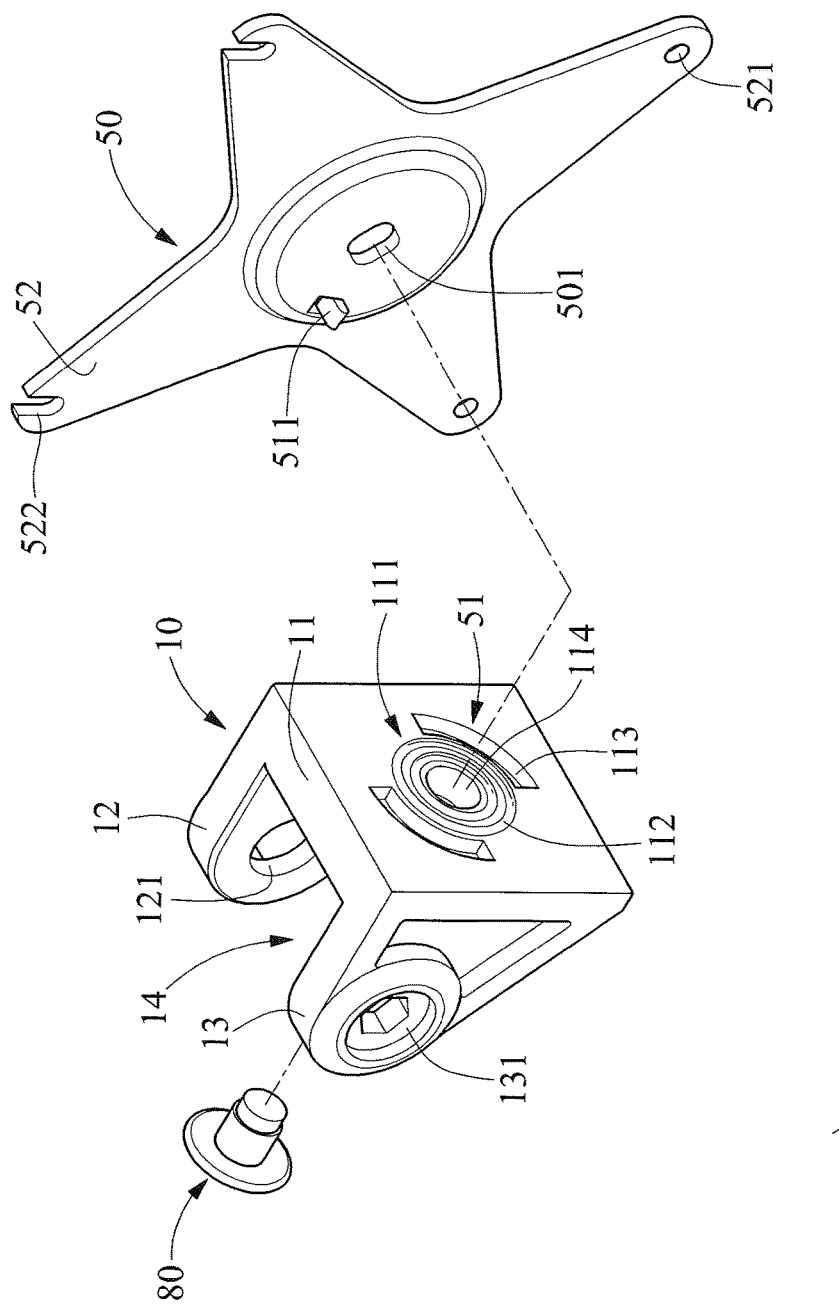
FIG. 3 is another partial and exploded view of the holder depicted in FIG. 1.
Figure 10:
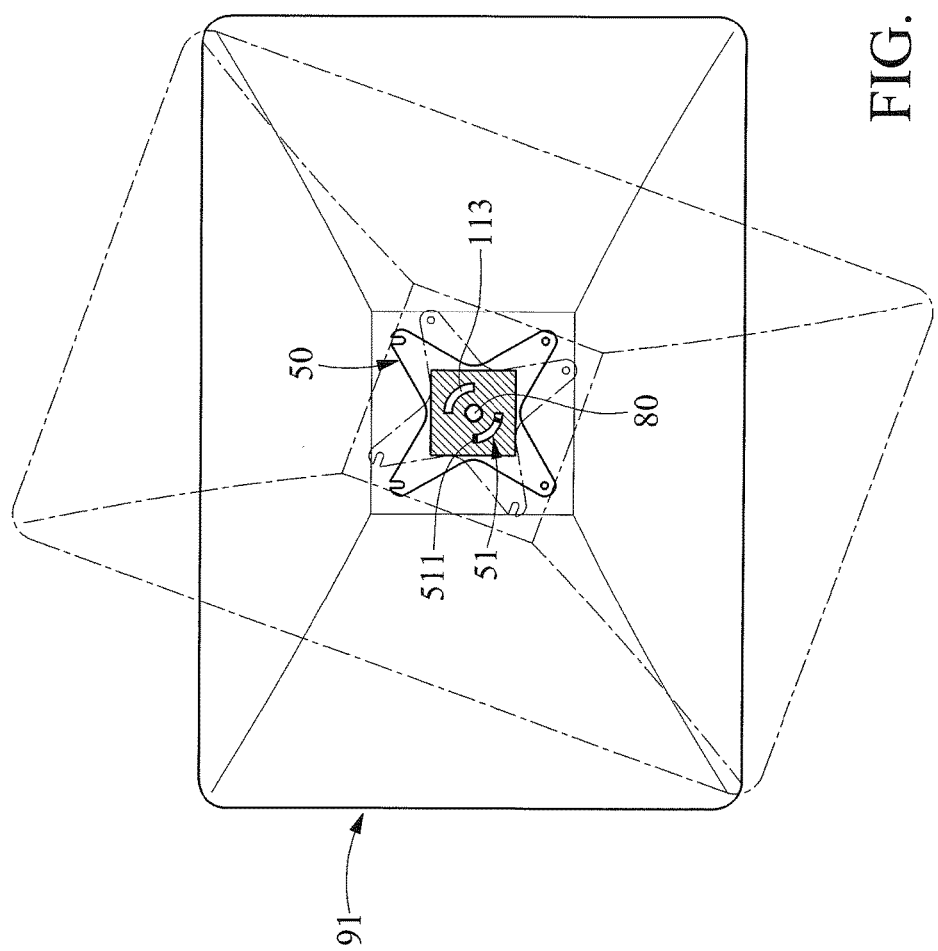
FIG. 10 is a rear view of the flat-panel display held rotatable about a horizontal axis by the holder shown in FIG. 7.

Referring to FIGS. 3 and 10, the flat-panel display 91, which is connected to the plate 50, can be rotated about the axis of the fastener 80 relative to the bracket 10. The rotation of the flat-panel display 91 and the plate 50 relative to the bracket 10 is limited by inserting the block 511 in the arched groove 113. The contact portion 111 of the positioning portion 11 reduces the friction between the bracket 10 and the plate 50.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:
1. A holder comprising:
a plate (50) adapted for connection to an external object;
a bracket (10) comprising:
a positioning portion (11) rotationally connected to the plate (50);

a first lug (12) extending from the positioning portion (11) and comprising a smaller aperture (121) and a larger aperture (122) in communication with the smaller aperture (121); and a second lug (13) extending from the positioning portion (11);

a connector (20) comprising:

a bearing (21) located between the first and second lugs (12, 13) and formed with a tapered bore (211) along a horizontal axis; and an axle (22) extending from the bearing (21) along a vertical axis;

an angle-retaining element (40) comprising:

an enlarged head (43) inserted in the larger aperture (122);

a tapered portion (41) inserted in the tapered bore (211);

a fastener (60) inserted in the angle-retaining element (40), the first and second lugs (12, 13) and the bearing (21); and a carrier (30) comprising a bearing (32) for receiving the axle (22).

2. The holder according to claim 1, further comprising a restraining unit (41) for preventing the angle-retaining element (40) from rotation relative to the first lug (12).

3. The holder according to claim 2, wherein the restraining unit (42) comprises:

at least one rib (421) formed on the first lug (12); and at least one recess (431) made in the angle-retaining element (40) and adapted for receiving the rib (421).

4. The holder according to claim 3, wherein the rib (421) is formed on a wall of the larger aperture (122), and the recess (431) is made in the enlarged head (43) of the angle-retaining element (40).

5. The holder according to claim 1, wherein the tapered portion (41) of the angle-retaining element (40) comprises an anti-skid periphery.

6. The holder according to claim 1, wherein the tapered portion (41) of the angle-retaining element (40) comprises a free end (411) with a diameter larger than that of a smaller end (212) of the tapered bore (21).

7. The holder according to claim 1, wherein the fastener (60) comprises:

a threaded bolt (601) inserted in the angle-retaining element (40), the first and second lugs (12, 13) and the bearing (21) and formed with an enlarged end pressed against the first lug (12); and a nut (602) engaged with the threaded bolt (601) and pressed against the second lug (13).

8. The holder according to claim 7, wherein the second lug (13) comprises a countersink hole (131) for non-rotationally receiving the nut (602).

9. The holder according to claim 1, further comprising:

a washer (23) located at an end of the bearing (32) of the carrier (30) while the bearing (21) of the connector (20) is located at another end of the bearing (32) of the carrier (30); and a vertical threaded bolt (70) comprising a threaded portion (701) inserted in the axle (22) and an enlarged head (702) placed against the washer (23).

10. The holder according to claim 9, wherein the axle (22) comprises screw hole (221) for receiving the threaded portion (701) of the vertical threaded bolt (70).

11. The holder according to claim 9, wherein the washer (23) comprises at least one boss (704) formed thereon, and the axle (22) comprises at least one recess (222) for receiving the boss (704).

12. The holder according to claim 1, wherein the positioning portion (11) comprises a contact portion (111) in contact with the plate (50).

13. The holder according to claim 12, wherein the contact portion (111) comprises several annular ribs (112).

14. The holder according to claim 1, further comprising a limiting unit (51) for limiting rotation oft the plate (50) relative to the bracket (10) in a range.

15. The holder according to claim 14, wherein the limiting unit (51) comprises at least one block (511) extending from the plate (50) and at least one arched groove (113) made in the positioning portion (11) and adapted for receiving the block (511).

16. The holder according to claim 1, wherein the plate (50) comprises four prongs (52), at least one of the prongs (52) comprises an aperture (521), and at least one of the prongs (52) comprises a cutout (522).

17. The holder according to claim 1, wherein the carrier (30) comprises two flanges (31) for movable insertion in two grooves (902) of a track (901).

* * * * *